United States Patent
Kondo et al.

(10) Patent No.: US 8,261,603 B2
(45) Date of Patent: Sep. 11, 2012

(54) MISFIRE DETECTION APPARATUS FOR INTERNAL COMBUSTION ENGINE

(75) Inventors: Ryo Kondo, Toyota (JP); Akihiro Katayama, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 234 days.

(21) Appl. No.: 12/863,628

(22) PCT Filed: Dec. 25, 2008

(86) PCT No.: PCT/JP2008/003962
§ 371 (c)(1),
(2), (4) Date: Jul. 20, 2010

(87) PCT Pub. No.: WO2009/093296
PCT Pub. Date: Jul. 30, 2009

(65) Prior Publication Data
US 2010/0294027 A1    Nov. 25, 2010

(30) Foreign Application Priority Data
Jan. 23, 2008  (JP) .................................. 2008-012922

(51) Int. Cl.
*G01M 15/11*    (2006.01)
(52) U.S. Cl. .................................. 73/114.03; 73/114.08
(58) Field of Classification Search ............... 73/114.02, 73/114.03, 114.04, 114.05, 114.08
See application file for complete search history.

(56) References Cited

U.S. PATENT DOCUMENTS

| 6,584,834 B1 | 7/2003 | Lehner et al. |
| 2003/0163242 A1 | 8/2003 | Miyauchi et al. |
| 2004/0237635 A1 | 12/2004 | Ohsaki et al. |

FOREIGN PATENT DOCUMENTS

| JP | 04-159438 A | 6/1992 |
| JP | 05-180063 A | 7/1993 |
| JP | 05-340294 A | 12/1993 |
| JP | 08-270490 A | 10/1996 |
| JP | 2000-282940 A | 10/2000 |
| JP | 2002-202000 A | 7/2002 |

OTHER PUBLICATIONS

International Search Report for PCT/JP2008/003962, dated May 13, 2009.

*Primary Examiner* — Eric S McCall
(74) *Attorney, Agent, or Firm* — Sughrue Mion, PLLC

(57) ABSTRACT

Structured with a rotational fluctuation measuring section 51 measuring a rotational fluctuation amount DTdi, a misfire judging section 55 judging a misfire by comparing the rotational fluctuation amount with a judging threshold value, a low load judging section 56 judging an internal combustion engine operating under a low load condition, and an ignition angle judging section 57 judging an ignition angle exceeding an ignition delay angle, wherein the misfire judging section 55 has a map M1 with judging threshold values th1 with respect to rotational speeds ne of the engine and a map M2 with judging threshold values th2 with rotational fluctuation amounts larger than the map M1, and judges the misfire based on the maps M1 and M2 when the engine is operating under the low load condition with the ignition angle exceeding the ignition delay angle and, in other cases, based only on the map M1.

6 Claims, 5 Drawing Sheets

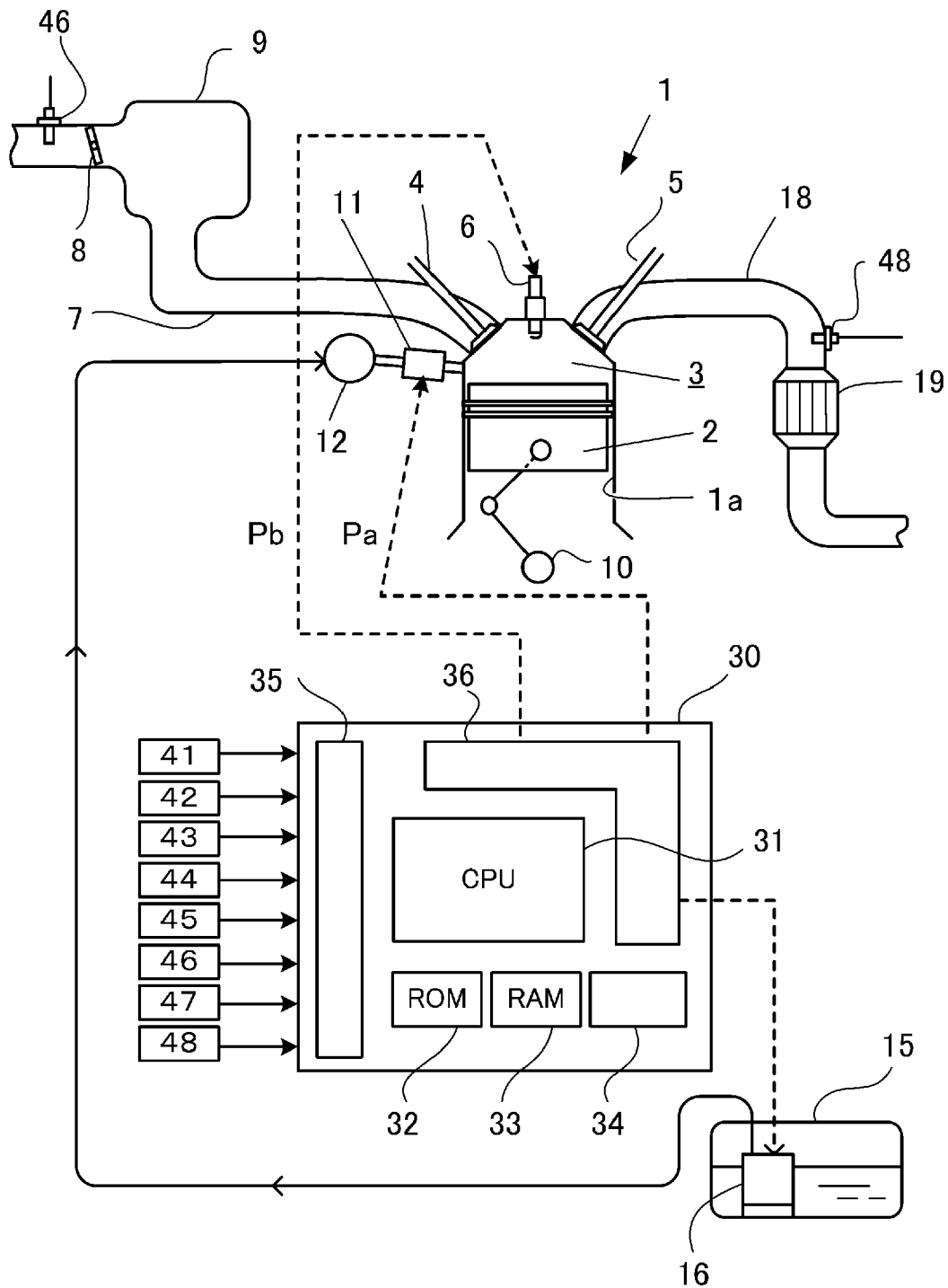
[Fig. 1]

[Fig. 2]
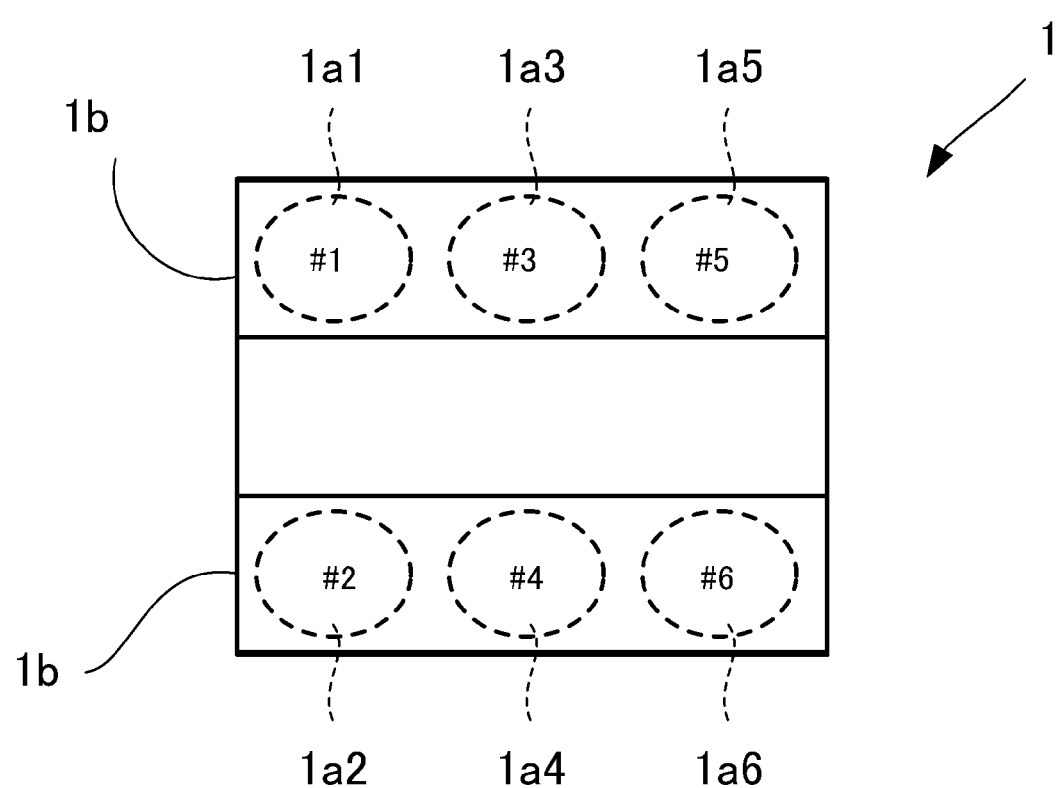

[Fig. 3]
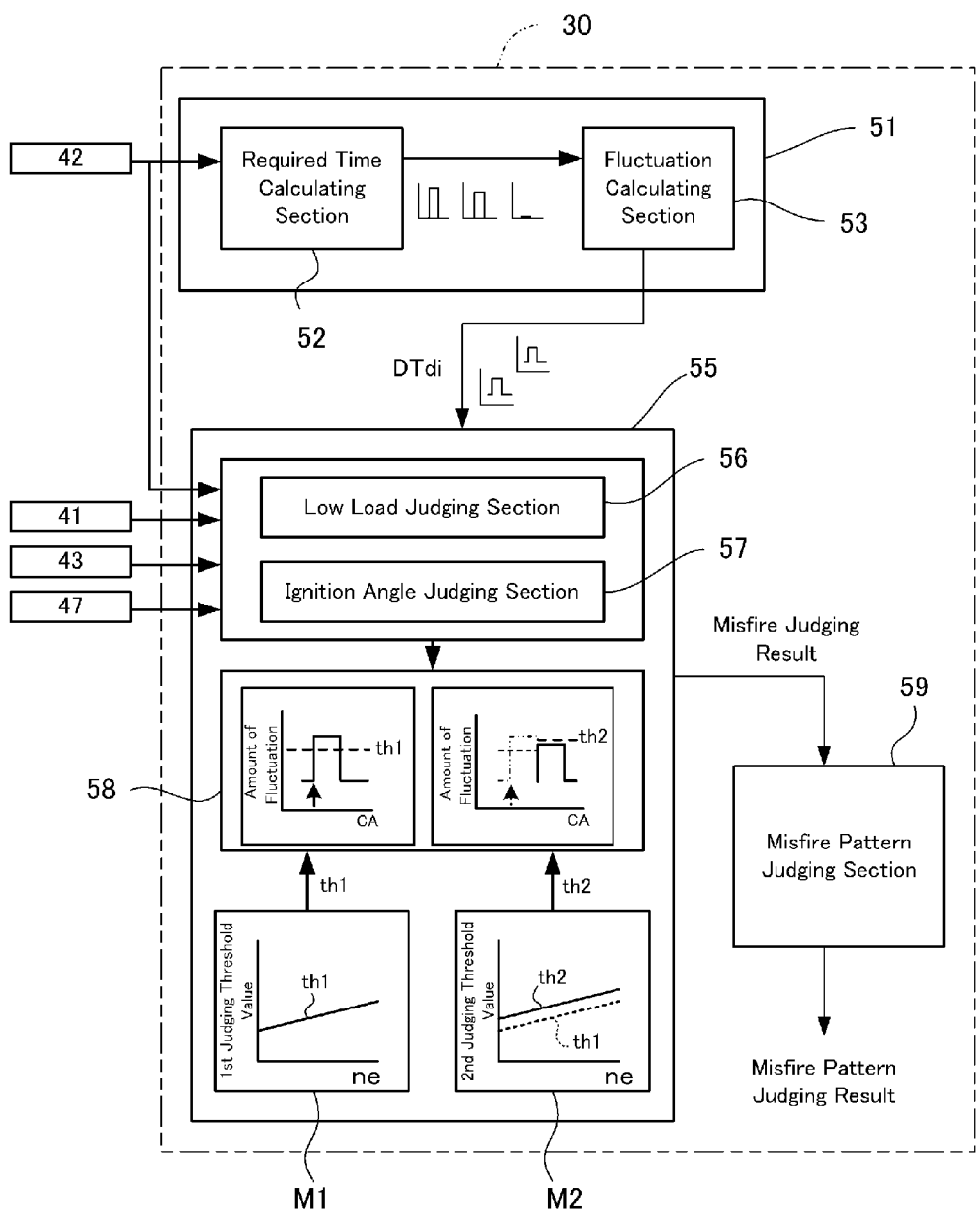

[Fig. 4]
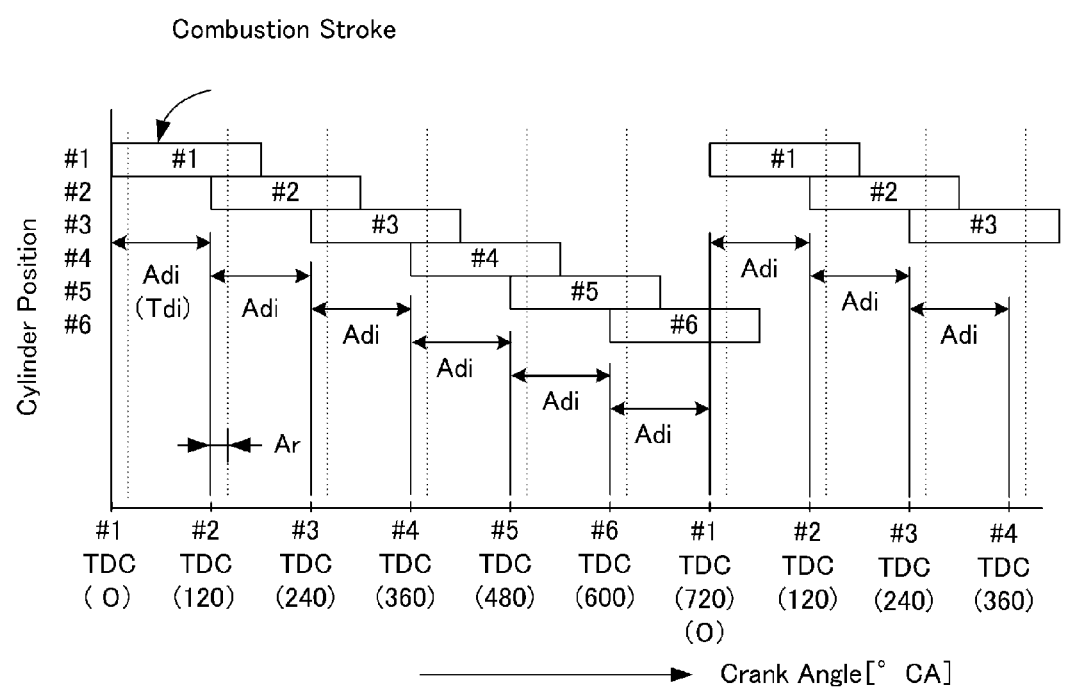

[Fig. 5]
(a)
Normal Misfire judging
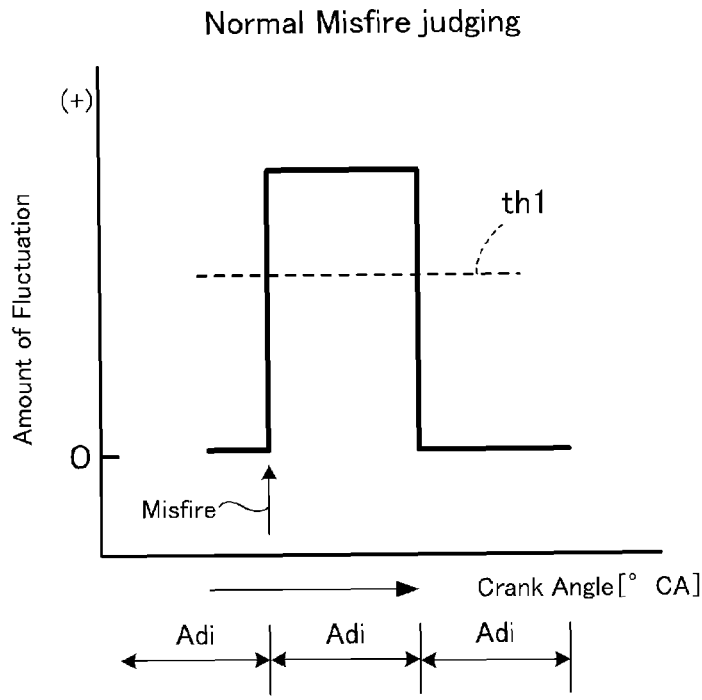
(b)
Misfire Judging Under Low Load and Large Delay Angle
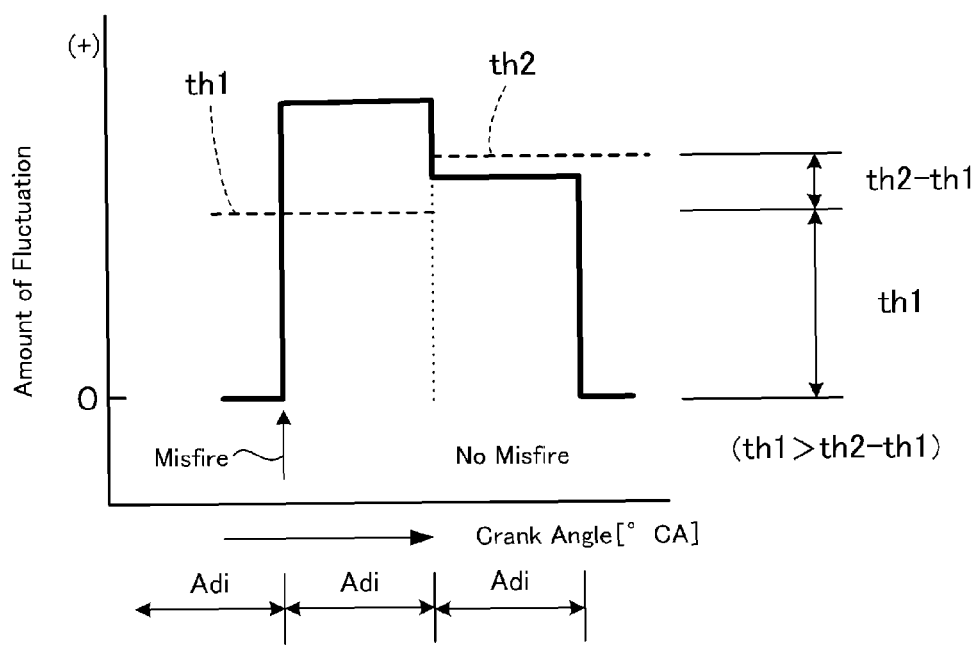

MISFIRE DETECTION APPARATUS FOR INTERNAL COMBUSTION ENGINE

TECHNICAL FIELD

The present invention relates to a misfire detection apparatus for an internal combustion engine, and more particularly to a misfire detection apparatus for detecting a misfire of fuel failing to be ignited and burned in any one of engine cylinders assembled in a spark ignition type of multi-cylinder internal combustion engine based on information about rotations fluctuated upon the misfire in the engine cylinder.

BACKGROUND ART

In general, such a misfire of fuel failing in being ignited and burned is apt to be caused during the operation of the spark ignition type of multi-cylinder internal combustion engine (hereinafter also referred to simply as an engine or an internal combustion engine) resulting from a variety of reasons such as malfunctions of electrically controlling devices and an abruptly changed ratio of the air-fuel mixture. The misfire caused in the combustion stroke of any one of engine cylinders (hereinafter also referred to simply as cylinders) assembled in the spark ignition type of multi-cylinder internal combustion engine leads to the output torque of the engine reduced as well as a crank angular velocity lowered from those generated under a normal condition with the same load. To detect the misfire, there have so far been proposed and thus known a wide range of misfire detection apparatuses each of which judges the misfire by detecting the rotational speed fluctuation of the internal combustion engine.

As one of the typical examples of a misfire detection apparatus for use in an internal combustion engine, there is disclosed and thus known a misfire detection apparatus in Japanese Patent Laid-Open Publication No. 2002-202000. The disclosed misfire detection apparatus can enhance an accuracy of misfire detection by correcting a judging threshold value for judging the misfire corresponding to the operating condition of a tumble generator valve serving as an intake valve provided in an intake air system when comparing the time required for a crankshaft to rotate from a compression top dead center to a predetermined crank angle with the judging threshold value to judge the misfire.

In addition, Japanese Patent Laid-Open Publications Nos. 05-180063, 08-270490, 04-159438, and 2000-282940 respectively disclose misfire detection apparatuses each of which is aimed to enhance the accuracy of misfire detection. For this purpose, the misfire detection apparatus disclosed in Japanese Patent Laid-Open Publication No. 05-180063 is constituted to provide a plurality of exclusive no-load maps and loaded-load maps corresponding to a type of speed shifting mechanism exemplified by an automatic transmission and a manual transmission and selecting a different judging value map corresponding to the type of speed shifting mechanism and the condition of clutch engagement. The misfire detection apparatus disclosed in Japanese Patent Laid-Open Publication No. 08-270490 is adapted to store correction values obtained by learning rotational speed deviations between engine cylinders and correction values according to the amount of intake air (i.e., load) for each engine cylinder in respective maps and then to compare the amount of rotational speed fluctuation for each combustion stroke of each of the engine cylinders after corrected by the correction values with the misfire judging value.

The misfire detection apparatus disclosed in Japanese Patent Laid-Open Publication No. 04-159438 is designed to change a calculating condition of misfire judging level corresponding to the rotational speed of the engine and the load that is an inertia weight engaged with a crankshaft which varies by a shift position and the condition of clutch engagement.

The misfire detection apparatus disclosed in Japanese Patent Laid-Open Publication No. 2000-282940 functions to change the gain of an air-fuel ratio feedback control when a roughness (i.e., combustion fluctuation) control is active to a small value relative to the gain of the air-fuel ratio feedback control when the roughness control is inactive so as to make the correction of ignition timing in a delay angle direction not greatly restricted by the correction of ignition timing in an advance angle direction in response to changes in the air-fuel ratio.

DISCLOSURE OF INVENTION

Problem to be Solved by the Invention

The misfire detection apparatuses available for an internal combustion engine in related art described above perform the misfire judgment in each measurement period which is the time required for a crankshaft to rotate from a compression top dead center to reach a predetermined crank angle (for example, 120 degrees CA time in a six-cylinder engine) for each of the cylinders in the order of ignition (i.e. order of combustion strokes). The conventional misfire detection apparatuses, however, may erroneously judge the misfire even when no misfire occurs in the measurement period subsequent to the measurement period in which the misfire occurred, because the fluctuation in rotation upon the misfire continues over to the subsequent measurement period, when the engine is in operation under the condition where the rotations are largely fluctuated upon the misfire.

More specifically, the rotation of the engine is greatly reduced with a single misfire under a low load condition and while the ignition angle is of a large ignition delay angle, for example, under an idling operation to warm up a catalytic converter immediately after a start-up of the engine. For this reason, when the rotation speed is still reduced in the subsequent misfire measurement period, the misfire may be erroneously judged even when no misfire actually occurs. Further, the conventional misfire detection apparatus for a multi-cylinder four stroke internal combustion engine having four cylinders or more tends to erroneously detect a misfire by reason that the detection of misfire is easily influenced by partially-overlapped two combustion strokes of cylinders next to each other in ignition, i.e., the cylinders in consecutive combustion strokes.

The conventional misfire detection apparatus for an internal combustion engine fails to provide sufficient accuracy in detecting a misfire.

It is, therefore, an object of the present invention to provide a misfire detection apparatus for a spark ignition type of internal combustion engine which can detect a misfire with accuracy even when the internal combustion engine is operating under a low load condition and the ignition angle is of a large ignition delay angle.

Means for Solving the Problem

In order to attain the object, (1) a misfire detection apparatus for a spark ignition type of multi-cylinder internal combustion engine having measuring means for measuring an amount of fluctuation in rotation of a crankshaft of the multi-cylinder internal combustion engine in a measurement period indicative of a predetermined range of rotation angle for a plurality of engine cylinders successive in order of ignition, misfire judging means for judging whether or not a misfire occurred in any one of the plurality of engine cylinders in accordance with a result obtained by comparing the amount of fluctuation measured by the measuring means with a predetermined first judging threshold value, operating condition judging means for judging whether or not the multi-cylinder internal combustion engine is in operation under a predetermined specific operating condition, and ignition angle judging means for judging whether or not an ignition angle is larger than a predetermined ignition delay angle, in which the misfire judging means is provided with a first judging threshold value map representing the first judging threshold value as a function of rotational speed of the multi-cylinder internal combustion engine and a second judging threshold value map representing a second judging threshold value larger than the first threshold value as a function of rotational speed of the multi-cylinder internal combustion engine, the misfire judging means judges whether or not the misfire occurred by comparing the amount of fluctuation with the first judging threshold value and the second judging threshold value when the operating condition judging means judges that the multi-cylinder internal combustion engine is in operation under the predetermined specific operating condition and the ignition angle judging means judges that the ignition angle is larger than the predetermined delay angle, and only with the first judging threshold value when the operating condition judging means judges that the multi-cylinder internal combustion engine is not in operation under the predetermined specific operating condition or the ignition angle judging means judges that the ignition angle is not larger than the predetermined ignition delay angle.

According to the structure described above, when the multi-cylinder internal combustion engine is not in operation under the specific operating condition (i.e., low load condition) or the ignition angle is not larger than the predetermined ignition delay angle, the misfire detection apparatus can judge whether or not the misfire occurred in any one of the plurality of engine cylinders based on the first judging threshold value set with respect to the rotational speed of the engine in the first judging threshold value map. Meanwhile, when the multi-cylinder internal combustion engine is in operation under the specific operating condition and the ignition angle is larger than the predetermined ignition delay angle, the misfire detection apparatus judges whether or not the misfire occurred in any one of the plurality of engine cylinders based not only on the first judging threshold value set with respect to the respective rotational speed of the multi-cylinder internal combustion engine in the first judging threshold value map but also on the second judging threshold value set with respect to the rotational speed of the multi-cylinder internal combustion engine in the second judging threshold value map which is set with larger amounts of fluctuation in rotation (i.e. rotational fluctuation) than the first judging threshold value map. Consequently, the misfire detection apparatus accurately judges the misfire based on the second judging threshold value map set with the second judging threshold value which is set with the larger amount of rotational fluctuation than the first judging threshold value even when the rotational fluctuation in the measurement period in which the misfire occurred influences over the subsequent measurement period in which no misfire occurs while the engine is in operation under the specific operating condition and the ignition angle is of a large delay angle. It is desirable that the second judging threshold value be set so that the difference between the first judging threshold value and the second judging threshold value is smaller than the first judging threshold value set with respect to the minimum rotational fluctuation amount caused by the misfire since the amount of rotational fluctuation in the subsequent measurement period in which no misfire occurs is reduced from the preceding measurement period in which the misfire occurred (i.e., rotational deceleration of the crankshaft is reduced in the subsequent measurement period in which no misfire occurs) when the rotational fluctuation in the measurement period in which the misfire occurred influences over the subsequent measurement period in which no misfire occurs.

In the misfire detection apparatus for a spark ignition type of internal combustion engine described above according to (1), it is desirable that (2) the misfire judging means be operative to judge whether or not the misfire occurred in any one of the plurality of engine cylinders from comparison results based on values of the second judging threshold value map in the measurement period subsequent to the measurement period when the misfire judging means judges that the misfire occurred in one of the plurality of engine cylinders from comparison results based on values of the first judging threshold value map while the operating condition judging means judges that the multi-cylinder internal combustion engine is in operation under the predetermined specific operating condition and the ignition angle judging means judges that the ignition angle is larger than the predetermined ignition delay angle.

According to the structure described above, the misfire detection apparatus can detect the misfire fast and accurately in a most simple process when the misfire occurs even while the engine is in operation under the specific operating condition and the ignition angle is of a large delay angle.

In the misfire detection apparatus for a spark ignition type of internal combustion engine described above according to (1) and (2), (3) the measuring means may be operative to measure the amount of fluctuation in rotation of the crankshaft in a measurement period as a difference in rotation time required for the crankshaft to reach a predetermined crank angle after passing a compression top dead center between two successive periods of the measurement period for the plurality of engine cylinders successive in order of ignition, and the second judging threshold value represented in the second judging threshold value map may be set to have the required rotation time longer than the corresponding required rotation time of the first judging threshold value represented in the first judging threshold value map.

According to the structure described above, the misfire detection apparatus can almost certainly measure the influence of the rotational fluctuation caused by the misfire in the measurement period which corresponds to a required rotation time for the crankshaft to reach the predetermined crank angle for each of the plurality of engine cylinders successive in order of ignition by merely setting the predetermined crank angle so that the ignition occurs in the beginning of the measurement period.

In the misfire detection apparatus for a spark ignition type of internal combustion engine described above according to (1) to (3), it is desirable that (4) the specific operating condition include the rotational speed of the multi-cylinder internal combustion engine being less than a predetermined rotational speed, the temperature of cooling water for the multi-cylinder internal combustion engine being below a predetermined water temperature for a start-up of the multi-cylinder internal combustion engine, and the multi-cylinder internal combustion engine being in operation to warm up a catalytic converter for cleaning exhaust gases.

According to the structure described above, the misfire detection apparatus can certainly detect that the internal combustion engine is in operation under the specific operating condition with existing information used for the electronic control of the internal combustion engine.

In the misfire detection apparatus for a spark ignition type of internal combustion engine described above according to (1) to (4), it is further desirable that (5) the specific operating condition include an amount of intake air for the multi-cylinder internal combustion engine being less than a predetermined amount of intake air under low load condition and an inertia load which the multi-cylinder internal combustion engine is disengageable with being disengaged.

In this case, the misfire detection apparatus can certainly detect that the internal combustion engine is in operation under the specific operating condition also with existing information used for the electronic control of the internal combustion engine.

In the misfire detection apparatus for a spark ignition type of internal combustion engine described above according to (1) to (5), it is desirable that (6) the misfire detection apparatus further have pattern judging means for judging misfire patterns in the plurality of engine cylinders successive in order of ignition including a misfired one of the plurality of engine cylinders when the misfire judging means judges that the misfire occurred in one of the plurality of engine cylinders.

According to the structure described above, the misfire detection apparatus can more accurately judge the misfire by judging a plurality of misfires and their misfire patterns for the lengths of combustions for the plurality of engine cylinders successive in order of ignition when the misfire is detected.

In the misfire detection apparatus for a spark ignition type of internal combustion engine described above according to (1) to (6), it is desirable that (7) the multi-cylinder internal combustion engine have engine cylinders exceeding four cylinders.

According to the structure described above, the misfire detection apparatus can accurately detect the misfire even though the engine is structured in which the rotational fluctuation in the measurement period in which the misfire occurred is likely to influence over the subsequent measurement period in which no misfire occurs when the engine is in operation under the specific operating condition and the ignition angle is of a large delay angle.

The present invention provides the misfire detection apparatus for a spark ignition type of internal combustion engine that can accurately detect the misfire even when the internal combustion engine is in operation under a low load condition and the ignition angle is of a large delay angle since the misfire detection apparatus according to the present invention judges the misfire based on the judging threshold value set in the second judging threshold value map which is set with larger amounts of rotational fluctuation than the first judging threshold value map, in addition to the misfire judgment based on the first judging threshold value map, when the rotational fluctuation in the measurement period in which the misfire occurred influences over the subsequent measurement period in which no misfire occurs while the engine is in operation under a low load condition and the ignition angle is of a large delay angle.

BRIEF DESCRIPTION OF THE DRAWINGS

FIG. 1 is a schematic diagram illustrating the structure of a misfire detection apparatus for an internal combustion engine according to one preferred embodiment of the present invention;

FIG. 2 is a top view schematically illustrating the internal combustion engine according to the embodiment;

FIG. 3 is a functional block diagram of an ECU constituting the misfire detection apparatus according to the embodiment;

FIG. 4 is an explanatory diagram showing relationship of crank angles and explosive combustion strokes of cylinders according to the embodiment; and FIGS. 5A and 5B are explanatory diagrams showing the misfire judging levels used in the misfire detection apparatus for an internal combustion engine according to the embodiment.

BEST MODES FOR CARRYING OUT THE INVENTION

One preferred embodiment of a misfire detection apparatus for an internal combustion engine according to the present invention will be described hereinafter with reference to accompanying drawings.

FIG. 1 is a schematic diagram illustrating the construction of a misfire detection apparatus for a spark ignition type of internal combustion engine according to one embodiment of the present invention. FIG. 2 is a top view schematically illustrating the internal combustion engine according to the embodiment.

The construction of the misfire detection apparatus for internal combustion engine will be firstly described hereinafter. As shown in FIGS. 1 and 2, a spark ignition type of internal combustion engine (hereinafter also referred to simply as an engine or an internal combustion engine) to which the present embodiment is applied is structured as a multi-cylinder engine 1 having more than four engine cylinders (hereinafter also referred to simply as cylinders), a six-cylinder V-type engine, for example, to be mounted in an automotive vehicle (only one of the cylinders is cross-sectionally shown in FIG. 1). Each of the cylinders 1a is provided with a combustion chamber 3 therein separated by a piston 2, an intake valve 4 and an exhaust valve 5 driven by a valve drive mechanism not shown, and an ignition plug 6 arranged so as to be exposed in the combustion chamber 3. The intake pipe 7 provided with a throttle valve 8 and a surge tank 9 having a given volume is connected to the combustion chamber 3 and forms an intake air passage.

As shown in FIG. 2, the engine 1 is arranged with a pair of banks 1b1 and 1b2 each having three pieces of cylinders 1a1, 1a3 and 1a5, and 1a2, 1a4 and 1a6. The piston 2 of each cylinder is connected to a crank through portion of a crankshaft 10 (see FIG. 1) with a connecting rod therebetween, though details are not shown.

An injector (a fuel injection valve) 11 arranged on the cylinder 1a (each of the cylinders 1a1 through 1a6) is connected to a delivery pipe 12 which delivers fuel to the cylinder 1a. The fuel (for example, gasoline) discharged by a fuel pump 16 in a fuel tank 15 is supplied to the delivery pipe 12 through a predetermined fuel passage. The engine 1 may be any of a direct injection engine, a port injection engine, or a dual injection engine which performs both of direct injection and port injection as long as fuel injection is electronically controlled. Further, the engine may be a diesel engine or a gas engine (an LPG engine or an LNG engine) which uses fuel other than gasoline. A catalytic converter 19 for cleaning exhaust gases is provided to an exhaust pipe 18 for the engine 1.

The injector 11 and the ignition plug 6 are respectively arranged in the vicinity of the combustion chamber 3. The injector 11 and the ignition plug 6 are respectively controlled by a fuel injection signal Pa and an ignition timing control signal Pb which are outputs from an engine electronic control unit (ECU) 30 for electronically controlling the engine 1.

The engine ECU 30, while its detailed hardware structure is not shown, is composed of a central processing unit (CPU) 31, a read only memory (ROM) 32, a random access memory (RAM) 33 and a non-volatile memory 34 for back-up. The engine ECU 30 is also provided with an input interface circuit 35 including an A/D converter and an output interface circuit 36.

The input interface circuit 35 of the engine ECU 30 is coupled with various sensors mounted on the engine 1 such as for example an air flow meter 41 for detecting an intake air flow, a crank angle sensor 42 for detecting the rotation of the crankshaft for each predetermined crank angle (e.g., 30 degrees crank angle), a throttle sensor 43 for detecting the opening of the throttle valve, a speed sensor 44 for detecting a speed of the vehicle, a cam position sensor (cylinder identifying sensor) 45 for detecting a position of rotational angle of a cam shaft, an intake air temperature sensor 46 for detecting a temperature of intake air, a water temperature sensor 47 for detecting a temperature of cooling water, and an oxygen sensor 48 for detecting oxygen concentration in the exhaust gases. The engine ECU 30 is constituted so as to fetch sensor information from these sensors. The output interface circuit 36 of the engine ECU 30 is coupled not only with the injector 11, but also with an igniter (not shown) for igniting the ignition plug 6 through a distributor (not shown) and a relay switch circuit (not shown) for turning the fuel pump 16 on and off.

The CPU 31 of the engine ECU 30 is constituted so as to perform arithmetic processing based on the sensor information fetched from the input interface circuit 35, predetermined set up value information, map data and such in accordance with control programs mainly stored in the ROM 32 while exchanging data with the RAM 33 and back-up memory 34, and outputs control signals according to the processing results through the output interface circuit 36 to electronically control the engine 1.

More specifically, the engine ECU 30 calculates the amount of intake air per one rotation of the engine 1 based on the information from the air flow meter 41 and the crank angle sensor 42, and calculates a basic fuel injection time in which the injector 11 works to inject the amount of fuel corresponding to the amount of intake air per one rotation to meet with a predetermined target air-fuel ratio. The engine ECU 30 then determines an optimum fuel injection time to achieve an optimum air-fuel ratio with corrections to the basic fuel injection time based on the signals from the various sensors, and performs fuel injection by the injector 11 at the timing when the crankshaft reaches to a predetermined crank angle. Further, the engine ECU 30 controls ignition timing and opening of the throttle valve according to the operating condition of the engine 1. Furthermore, the engine ECU 30 drives the injector 11 through the output interface circuit 36, and outputs the fuel injection signal Pa for controlling the amount of fuel injected in the engine 1 to a target amount of fuel injection, the ignition timing control signal Pb for controlling the timing to ignite the ignition plug 6 through the igniter, and a switching signal for the relay switch to turn the fuel pump 16 on and off.

The engine ECU 30 has, in addition to the above described functions, a function to judge the misfire which will be described later.

FIG. 3 is a functional block diagram showing the engine ECU 30 constituting the misfire detection apparatus according to the present embodiment. As shown in FIG. 3, the engine ECU 30 is structured with a rotational fluctuation measuring section 51 (measuring means) for measuring an amount of rotational fluctuation DTdi of the crankshaft 10 in successive measurement periods for the plurality of cylinders 1a of the engine 1 in consecutive combustion strokes (e.g., first cylinder 1a1 and second cylinder 1a2, second cylinder 1a2 and third cylinder 1a3, . . . or sixth cylinder 1a6 and first cylinder 1a1) and a misfire judging section 55 (misfire judging means) for judging whether or not a misfire occurred in any one of the plurality of cylinders 1a according to the comparison result of the amount of rotational fluctuation DTdi measured by the rotational fluctuation measuring section 51 with a predetermined judging threshold value.

The rotational fluctuation measuring section 51 has a required time calculating section 52 for calculating a rotation time required for the crankshaft 10 to rotate from a compression top dead center to reach a predetermined crank angle (e.g., 120 degrees CA) for each of the plurality of cylinders 1a in consecutive combustion strokes, and a fluctuation calculating section 53 for calculating a difference in the required rotation time calculated between the two successive measurement periods by the required time calculating section 52 as the amount of rotational fluctuation DTdi of the crankshaft 10 for the measurement period. The required time calculating section 52 is similar to known calculating means for calculating the time required for a crankshaft to rotate a constant angle. The fluctuation calculating section 53 stores at least one or more of previously calculated values of the required rotation time (e.g., two previously calculated values) in a part of a working memory area of the RAM 33 and outputs, each time the latest required rotation time is calculated, the difference between the latest required rotation time and the last calculated required rotation time stored in the RAM 33 to the misfire judging section 55 as the new amount of rotational fluctuation DTdi.

Meanwhile, the misfire judging section 55 includes a low load judging section 56 (operating condition judging means) for judging whether or not the engine 1 is in operation under a predetermined low load condition, an ignition angle judging section 57 (ignition angle judging means) for judging whether or not the ignition angle of the engine 1 is larger than a predetermined ignition delay angle Ar, and a judging section 58 for judging the misfire while changing a misfire judging condition in accordance with the judging results of the low load judging section 56, the ignition angle judging section 57, and the misfire judging section 55.

The low load condition used for judging the low load condition by the low load judging section 56 is predetermined and stored in the back-up memory 34. The low load condition described above includes the rotational speed ne of the engine 1 being less than a predetermined rotational speed close to an idling speed, the opening of the throttle valve being at the minimum, the temperature of cooling water passing through a water jacket portion (not shown in details) of the engine 1 being below a predetermined start-up judging water temperature, and the engine 1 being in operation to warm up the exhaust gas catalytic converter 19. Accordingly, the low load status is thus judged when the engine 1 is in operation to warm up the engine 1 or the exhaust gas catalytic converter 19 immediately after the start-up. Further, the low load condition includes the amount of intake air for the engine 1 being less than a predetermined amount of intake air under the low load condition and an inertia load with which the engine 1 is engaged and disengaged such as a clutch, shift gears in a subsequent stage being disengaged.

The ignition angle judging section 57 recognizes the ignition timing based on the ignition timing control signal Pb and judges whether or not the ignition angle is larger than the ignition delay angle Ar stored in advance in the ROM 31 or in a part of memory area of the back-up memory 34.

The judging section 58 has a first judging threshold value map M1 for determining a first judging threshold value th1 as a function to the rotational speed ne of the engine 1 and a second judging threshold value map M2 for determining a second judging threshold value th2 which is larger than the first judging threshold value th1 as a function to the rotational speed ne of the engine 1.

Further, the judging section 58 judges whether or not the misfire occurred in any one of the plurality of cylinders 1a based on the first judging threshold value map M1 and the second judging threshold value map M2 when the low load judging section 56 judges that the engine is in operation under the low load condition and the ignition angle judging section 57 judges that the ignition angle is larger than the ignition delay angle Ar. In all other cases, the judging section 58 judges whether or not the misfire occurred in any one of the plurality of cylinders 1a based on the first judging threshold value map M1.

More specifically, when the low load judging section 56 judges that the engine is in operation under the low load condition and the ignition angle judging section 57 judges that the ignition angle is larger than the ignition delay angle Ar and, in addition, the judging section 58 judges that the misfire occurred in one of the plurality of cylinders 1a based on the first judging threshold value map M1 in the preceding measurement period, the judging section 58 then judges whether or not the misfire occurred in any one of the plurality of cylinders 1a based on the second judging threshold value map M2 for the subsequent measurement period.

The second judging threshold value th2 in the second judging threshold value map M2 for the judging section 58 is set lager than the first judging threshold value th1 set in the first judging threshold value map M1 with respect to the rotational speed ne of the engine 1.

When the rotational fluctuation during the measurement period of misfire in which the misfire occurred influences over the subsequent measurement period of no misfire in which no misfire occurred, the amount of rotational fluctuation DTdi in the subsequent measurement period of no misfire is smaller than the amount of rotational fluctuation DTdi in the last measurement period of misfire. In other words, the amount of rotational fluctuation in the subsequent measurement period of no misfire is smaller than the amount of rotational fluctuation in the preceding measurement period of misfire. Therefore, the second judging threshold value th2 is set so that the difference between the first judging threshold value th1 and the second judging threshold value th2 becomes smaller than the first judging threshold value th1 corresponding to the amount of rotational fluctuation DTdi (the minimum value) when the misfire occurred.

The misfire judging section 55 is provided, in addition to the functional sections described above, with a misfire pattern judging section 59 (pattern judging means) for judging fluctuation patterns of the amount of rotational fluctuation DTdi for the plurality of cylinders 1a in consecutive combustion strokes when the misfire is judged in one of the plurality of cylinders 1a. The misfire pattern judging section 59 detects misfire patterns for three consecutively ignited cylinders, more specifically, three cylinders in consecutive combustion strokes (e.g. cylinders 1a1 through 1a3, 1a2 through 1a4, . . . , or 1a6 through 1a2), e.g. using the two required rotation time values stored in the RAM 33 and the latest required time value calculated, such as a single cylinder misfire in which only one of the cylinders misfires; a two-consecutive cylinder misfire in which two consecutively ignited cylinders misfire in series; and an intermittent two-cylinder misfire in which one normal combustion occurs between two misfires, to further enhance the accuracy of misfire judgment by additionally performing a misfire judgment appropriate to the respective misfire patterns. The judging process of such misfire patterns is known as disclosed, for example, in Japanese Patent Laid-Open Publication No. 2003-343340.

The operation of the misfire detection apparatus will then be described hereinafter.

In the misfire detection apparatus for an internal combustion engine according to the present embodiment as structured as described above, the rotational fluctuation measuring section 51 fetches a rotation detection pulse for each predetermined rotation angle of the crankshaft 10 generated by the crank angle sensor 42. The required time calculating section 52 calculates in sequence the rotation time required for the crankshaft 10 to reach a predetermined crank angle after passing the compression top dead center for respective cylinders of the plurality of cylinders 1a in consecutive combustion strokes.

Further, the fluctuation calculating section 53 stores and retains at least one previously calculated value of the required time in a part of the working memory area of the RAM 33 and calculates, each time the latest required time is calculated, the difference between the latest required time calculated and the last required time stored in the RAM 33 and then outputs the difference as the amount of rotational fluctuation DTdi for the latest measurement period.

FIG. 4 is an explanatory diagram showing orders of explosive combustion strokes and relationships with crank angle of the cylinders of the engine 1, and the reference symbol Tdi corresponds to the measurement period.

In the misfire judging section 55 to which the rotational fluctuation measuring section 51 feeds the amount of rotational fluctuation DTdi, the low load judging section 56 judges whether or not the engine 1 is in operation under the predetermined low load condition and the ignition angle judging section 57 judges whether or not the ignition angle of the engine 1 is larger than the predetermined ignition delay angle Ar. The judging section 58 judges whether or not the misfire occurred while changing the judging condition of the misfire judgment in accordance with the judging results of the low load judging section 56, the ignition angle judging section 57, and the misfire judging section 55.

FIGS. 5A and 5B are explanatory diagrams showing the judging conditions of the misfire judgment.

Specifically, while the load of the engine 1 dissatisfies the low load condition described above or the ignition angle is not delayed exceeding the predetermined ignition delay angle Ar, as shown in FIG. 5A, the misfire detection apparatus judges whether or not the misfire occurred in any one of the plurality of cylinders 1a based on the first judging threshold value th1 determined as a function to the rotational speed ne of the engine 1 set in the first judging threshold value map M1. The misfired cylinder is judged in a known method.

On the other hand, while the engine 1 is in operation under the low load condition and the ignition angle is larger than the predetermined ignition delay angle Ar, for example, when the engine 1 is in operation to warm up the exhaust gas catalytic converter 19 immediately after the start-up, the apparatus judges whether or not the misfire occurred in any one of the plurality of cylinders 1a based not only on the first judging threshold value th1 determined as a function to the rotational speed ne set in the first judging threshold value map M1 but also on the second judging threshold value th2 which is set larger than the first judging threshold value th1. Accordingly, even when the rotational fluctuation in the measurement period of misfire influences over the subsequent measurement period of no misfire while the engine is being in operation under the low load condition and the ignition angle is of a large delay angle, the misfire detection apparatus can accurately detect the misfire because the misfire is judged based on the second judging threshold value th2 which is set larger than the first judging threshold value th1.

In particular, in the present embodiment, when the judging section 58 in the misfire judging section 55 judges that the misfire occurred based on the first judging threshold value map M1 in the measurement period while the engine 1 is in operation under the low load condition and the ignition angle is larger than the predetermined ignition delay angle Ar are judged, the judging section 58 in the misfire judging section 55 judges whether or not the misfire occurred based on the second judging threshold value map M2 in the subsequent measurement period. Accordingly, the misfire detection apparatus can detect the misfire fast and accurately in a simple process.

Further, the rotational fluctuation measuring section 51 is structured to measure the amount of rotational fluctuation DTdi in each measurement period Tdi for each of a specific crank angles Adi by the difference in the required rotation time to reach a predetermined crank angle Ap after passing the compression top dead center for each of the plurality of cylinders 1a in consecutive combustion strokes, and the second judging threshold value th2 in the second judging threshold value map M2 is set so as to have the required rotation time longer than the first judging threshold value th1 in the first judging threshold value map M1 with respect to the respective rotational speed of the engine 1. Therefore, by merely setting the predetermined crank angle Ap so that the ignition timing comes to the beginning of the measurement period, the rotational fluctuation measuring section 51 can almost certainly measure the influence of the rotational fluctuation upon the misfire in the measurement period of misfire Tdi which corresponds to the required rotation time for the crankshaft to reach the predetermined crank angle Ap for each of the plurality of cylinders 1a in consecutive combustion strokes.

In addition, in the misfire detection apparatus according to the present embodiment, since the low load condition used by the low load judging section 56 includes the rotational speed ne of the engine 1 being less than the predetermined rotational speed close to the idling speed, the temperature of cooling water for the engine 1 being lower than the predetermined start-up judging water temperature, and the engine 1 being in operation to warm up the exhaust gas catalytic converter 19, the low load judging section 56 can certainly detect the low load operating condition of the internal combustion engine with existing information used for the electronic control of the engine 1.

Moreover, since the low load condition further includes the amount of intake air for the engine 1 being less than the predetermined amount of intake air under the low load condition and the inertia load which the engine 1 is engageable and disengageable with being disengaged, the misfire detection apparatus can more accurately detect the low load operating condition of the engine 1.

Further, in the present embodiment, the misfire pattern judging section 59 judges the misfire patterns for the plurality of cylinders 1a in consecutive combustion strokes including the misfired cylinder 1a when the judging section 58 in the misfire judging section 55 judges that the misfire occurred in one of the plurality of cylinders 1a. Accordingly, the misfire detection apparatus can more accurately judge the misfire by further judging a plurality of misfires and their misfire patterns for the lengths of combustions for the plurality of cylinders 1a in consecutive combustion strokes including the misfired cylinder 1a when the misfire is judged.

Furthermore, since the present embodiment is directed to engines having more than four cylinders, the misfire detection apparatus can accurately detect the misfire even though the engine has a structure in which the rotational fluctuation in the measurement period of misfire is likely to influence over the subsequent measurement period of no misfire while operating under the low load condition and the ignition angle is of a large delay angle.

As described in the foregoing, since the misfire detection apparatus according to the present embodiment judges the misfire, in addition to judging the misfire based on the first judging threshold value th1, based on the second judging threshold value th2 which is set larger than the first judging threshold value th1, the misfire detection apparatus can accurately detect the misfire even when the engine is operating under a low load condition and the ignition angle is of a large delay angle.

While there has been described in this embodiment about the fact that the engine 1 has more than four cylinders, the engine may have four cylinders or three cylinders. The low load condition according to the present invention may be of conditions specifying other parameters than those conditions described above. Further, the misfire may be judged by having a plurality of second judging threshold values and selecting one out of the plurality of second judging threshold values in accordance with the amount of rotational fluctuation DTdi in the preceding measurement period when the misfire judging section 55 judges that the misfire occurred.

As will be seen from the foregoing description, the misfire detection apparatus for an internal combustion engine according to the present invention provides accurate detection of misfires even when the engine is in operation under a low load condition and the ignition angle is of a large delay angle and the rotational fluctuation in the measurement period of misfire influences over the subsequent measurement period of no misfire because the misfire is judged, in addition to judging the misfire based on the first judging threshold value, based on the second judging threshold value which is set larger than the first judging threshold value. As a consequence, the misfire detection apparatus for an internal combustion engine according to the present invention is particularly useful for a misfire detection apparatus for a spark ignition type of multi-cylinder internal combustion engine which detects the misfire by judging the misfire based on the information of rotational fluctuation due to the misfire occurred in one of the cylinders in the multi-cylinder internal combustion engine.

The invention claimed is:

1. A misfire detection apparatus for a spark ignition type of multi-cylinder internal combustion engine, comprising:
    measuring means for measuring an amount of fluctuation in rotation of a crankshaft of said multi-cylinder internal combustion engine in a measurement period indicative of a predetermined range of rotation angle for a plurality of engine cylinders successive in order of ignition;
    misfire judging means for judging whether or not a misfire occurred in any one of said plurality of engine cylinders in accordance with a result obtained by comparing said amount of fluctuation measured by said measuring means with a predetermined judging threshold value;
    operating condition judging means for judging whether or not said multi-cylinder internal combustion engine is in operation under a predetermined low load operating condition; and ignition angle judging means for judging whether or not an ignition angle is larger than a predetermined ignition delay angle, wherein said misfire judging means is provided with a first judging threshold value map representing said judging threshold value as a first judging threshold value which is equal to one specific amount of fluctuation specified by a function of rotational speed of said multi-cylinder internal combustion engine and a second judging threshold value map representing said judging threshold value as a second judging threshold value which is equal to another specific amount of fluctuation larger than said one specific amount of fluctuation corresponding to said first threshold value as a function of rotational speed of said multi-cylinder internal combustion engine, said misfire judging means judges whether or not said misfire occurred by comparing said amount of fluctuation with said first judging threshold value and said second judging threshold value when said operating condition judging means judges that said multi-cylinder internal combustion engine is in operation under said predetermined low load operating condition and said ignition angle judging means judges that said ignition angle is larger than said predetermined delay angle, and only with said first judging threshold value when said operating condition judging means judges that said multi-cylinder internal combustion engine is not in operation under said predetermined low load operating condition or said ignition angle judging means judges that said ignition angle is not larger than said predetermined ignition delay angle, and wherein said misfire judging means is operative to judge whether or not said misfire occurred in any one of said plurality of engine cylinders from comparison results based on values of said second judging threshold value map in said measurement period subsequent to said measurement period when said misfire judging means judges that the misfire occurred in one of the plurality of engine cylinders from comparison results based on values of said first judging threshold value map while said operating condition judging means judges that said multi-cylinder internal combustion engine is in operation under said predetermined low load operating condition and said ignition angle judging means judges that said ignition angle is larger than said predetermined ignition delay angle.

2. The misfire detection apparatus as set forth in claim 1, wherein said measuring means is operative to measure said amount of fluctuation in rotation of said crankshaft in a measurement period as a difference in rotation time required for said crankshaft to reach a predetermined crank angle after passing a compression top dead center between two successive periods of said measurement period for said plurality of engine cylinders successive in order of ignition, and said second judging threshold value represented in said second judging threshold value map is set to have said required rotation time longer than said corresponding required rotation time of said first judging threshold value represented in said first judging threshold value map.

3. The misfire detection apparatus as set forth in claim 1, wherein said low load operating condition includes the rotational speed of said multi-cylinder internal combustion engine being less than a predetermined rotational speed, the temperature of cooling water for said multi-cylinder internal combustion engine being below a predetermined water temperature for a start-up of said multi-cylinder internal combustion engine, and said multi-cylinder internal combustion engine being in operation to warm up a catalytic converter for cleaning exhaust gases.

4. The misfire detection apparatus as set forth in claim 1, wherein said low load operating condition includes an amount of intake air for said multi-cylinder internal combustion engine being less than a predetermined amount of intake air under low load condition and an inertia load which said multi-cylinder internal combustion engine is disengageable with being disengaged.

5. The misfire detection apparatus as set forth in claim 1, further comprising:

pattern judging means for judging misfire patterns in said plurality of engine cylinders successive in order of ignition including a misfired one of said plurality of engine cylinders when said misfire judging means judges that the misfire occurred in one of said plurality of engine cylinders.

6. The misfire detection apparatus as set forth in claim 1, wherein said multi-cylinder internal combustion engine has engine cylinders exceeding four cylinders.

* * * * *